(12) United States Patent
Wybenga et al.

(10) Patent No.: US 7,626,990 B2
(45) Date of Patent: Dec. 1, 2009

(54) PACKET COUNTERS AND PACKET ADDERS FOR TRAFFIC PROFILING IN A MULTIPROCESSOR ROUTER

(75) Inventors: Jack C. Wybenga, Plano, TX (US); Patricia Kay Sturm, Marion, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 826 days.

(21) Appl. No.: 11/019,935

(22) Filed: Dec. 21, 2004
(Under 37 CFR 1.47)

(65) Prior Publication Data
US 2005/0249206 A1    Nov. 10, 2005

Related U.S. Application Data

(63) Continuation-in-part of application No. 10/841,128, filed on May 7, 2004.

(51) Int. Cl.
*H04L 12/56* (2006.01)
(52) U.S. Cl. .................................... 370/395.7
(58) Field of Classification Search ............... 370/412, 370/413, 428, 429
See application file for complete search history.

(56) References Cited

U.S. PATENT DOCUMENTS

| 4,731,676 | A * | 3/1988 | Berlekamp ............... 360/26 |
| 6,671,747 | B1 * | 12/2003 | Benkual et al. ............. 710/1 |
| 6,754,206 | B1 * | 6/2004 | Nattkemper et al. ...... 370/369 |
| 2002/0129208 | A1 * | 9/2002 | Barroso et al. ............ 711/141 |
| 2002/0141403 | A1 * | 10/2002 | Akahane et al. ........... 370/389 |
| 2004/0184444 | A1 * | 9/2004 | Aimoto et al. ............ 370/352 |

* cited by examiner

*Primary Examiner*—Gregory B Sefcheck
*Assistant Examiner*—Nima Mahmoudzadeh (57) ABSTRACT

A packet counter/adder for use in a multiprocessor system. The packet counter stores a counter value of data packets processed by a plurality of processors in the multiprocessor system. The packet counter comprises a first register capable of storing the counter value, wherein the counter value in the first register is incremented by a write operation to a first address associated with the first register. The counter value in the first register may be set to a specified value by a write operation to a second address associated with the first register.

20 Claims, 5 Drawing Sheets

PACKET COUNTERS AND PACKET ADDERS FOR TRAFFIC PROFILING IN A MULTIPROCESSOR ROUTER

CROSS-REFERENCE TO RELATED APPLICATION

The present invention is a continuation-in-part of U.S. patent application Ser. No. 10/841,128, entitled "Apparatus and Method for Packet Length and Enhanced Traffic Profiling in a Massively Parallel Router" filed on May 7, 2004. Patent application Ser. No. 10/841,128 is assigned to the assignee of the present application. The subject matter disclosed in patent application Ser. No. 10/841,128 is hereby incorporated by reference into the present disclosure as if fully set forth herein.

TECHNICAL FIELD OF THE INVENTION

The present invention is generally directed to distributed architecture routers and, in particular, to fast, efficient, easy-to-use packet counters and packet length adders for use in a multi-processor and multi-process environment.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

Current generation high-speed routers do not provide much in the way of traffic profiling capability. Traffic profiling is performed by external test equipment instead. However, using external test equipment to profile data traffic is costly, since the test equipment must be purchased in addition to the router. This equipment is very expensive if high bandwidth links are analyzed.

Similarly, most billing functions are relegated to access points. Conventional routers do not provide billing information on traffic flowing through the router, but rather provide billing information for terminating traffic only. There is no way of charging for peak data flow at busy times in intermediate routers to encourage movement of massive amounts of data to slack periods and to spread network load more evenly over time. This kind of control is left to the terminating points, such as access points. Thus, intermediate routers, including core routers, depend upon access points to control their traffic.

The Applicants filed U.S. patent application Ser. No. 10/841,128, entitled "Apparatus and Method for Packet Length and Enhanced Traffic Profiling in a Massively Parallel Router" on May 7, 2004. Application Ser. No. 10/841,128 was directed to a high-speed router comprising a plurality of routing nodes coupled to a switch fabric. Each routing node determines packet lengths of data packets received in the routing node and sums packet lengths of data packets associated with particular routes. Each routing node comprises route counters that store counts of data packets for particular routes and store packet length sum values of data packets for particular routes. The routing node calculates a first bandwidth value from a first data packet count and a first packet length sum value stored in the route counters.

The Applicants also filed U.S. patent application Ser. No. 10/840,988, entitled "Apparatus and Method for Traffic Profiling in a Massively Parallel Router" on May 7, 2004. Application Ser. No. 10/840,988 was directed to a high-speed router comprising a plurality of routing nodes coupled to a switch fabric. Each routing node identifies at least one traffic type indicia associated with data packets and counts data packets based on traffic type indicia. Each routing node stores route counters and identification (ID) counters. The route counters store data packet counts for particular routes. The ID counters store data packet counts for particular traffic type indicia.

The subject matter disclosed in U.S. patent application Ser. Nos. 10/841,128 and 10/840,988 is hereby incorporated by reference in the present disclosure as if fully set forth herein. The routers disclosed in patent application Ser. Nos. 10/841,128 and 10/840,988 make extensive use of packet counters and packet length adders that track the number and type of data packets associated with each route, thereby enabling traffic profiling to be performed.

Normally, packet counter or summation updates in a multiprocessor environment are done through atomic read-modify-write instructions or through coordination among the multiple processors in such a system. In some prior art multiprocessor systems, this coordination may be done using time slices for each processor to gain access or through a software semaphore. However, the microengines of some data processors may not implement atomic read-modify-write instructions. Also, in some embodiments, the use of time slices may be impractical, since packet processing may be performed simultaneously by many microengines and threads and any form of synchronization would slow down the forwarding threads. Furthermore, software semaphores may increase the workload by requiring accesses to the semaphore and wait states for other threads to finish their access.

Therefore, there is a need in the art for improved high-speed routers capable of profiling data traffic through the router. In particular, there is a need for improved packet counters and packet adders that may be accessed and incremented by multiple processors and/or microengines without using read-modify-write instructions and without using synchronized time slices or software semaphores.

SUMMARY OF THE INVENTION

The present invention updates a packet counter or packet length adder in a single bus access by providing a write strobe to the increment address of the counter or by executing a write operation to the packet length adder with the packet length on the data bus. Since each operation takes place in a single bus access, the bus arbiter takes care of all contentions among the multiple processors. Thus, it is not necessary for software to execute an increment or an add instruction to update these counters or adders. For a packet counter, the data accompanying the write cycle is a "Don't Care" value. Thus, it is not even necessary to preload a register with any particular data.

Accordingly, to address the above-discussed deficiencies of the prior art, it is a primary object of the present invention to provide a packet counter for use in a multiprocessor system and a related method. According to an advantageous embodiment, the packet counter is capable of storing a counter value of data packets processed by a plurality of processors in the multiprocessor system. The packet counter comprises a first register capable of storing the counter value, wherein the counter value in the first register is incremented by a write operation to the packet counter by a first one of the plurality of processors.

According to one embodiment of the present invention, the counter value in the first register is incremented by a write operation to a first address associated with the first register.

According to another embodiment of the present invention, the counter value in the first register may be set to a specified value by a write operation to a second address associated with the first register.

According to still another embodiment of the present invention, a read operation to the first address by the first processor returns the counter value from the first register to the first processor and clears the counter value in the first register.

According to yet another embodiment of the present invention, a read operation to the second address by the first processor returns the counter value from the first register to the first processor and does not clear the counter value in the first register.

According to a further embodiment of the present invention, the packet counter further comprises a second register capable of storing an overflow flag, wherein the overflow flag is set when the counter value in the first register is incremented past a maximum value.

It is another primary object of the present invention to provide a packet length adder for use in a multiprocessor system and a related method. According to an advantageous embodiment, the packet length adder is capable of storing a packet length summation value of data packets processed by a plurality of processors in said multiprocessor system. The packet length adder comprises a first register capable of storing said packet length summation value, wherein said packet length summation value in said first register is incremented by a packet length value on a data bus of said packet length adder by a write operation to said packet length adder by a first one of said plurality of processors.

It is still another primary object of the present invention to provide a method of counting packets for use in a multiprocessor system. The method counts data packets routed by a plurality of packet processing elements using a packet counter comprising a first register capable of storing a counter value. According to an advantageous embodiment of the present invention, the method comprising the steps of: 1) detecting a write operation to the packet counter by a first one of the packet processing elements; and 2) in response to the detection of the write operation, incrementing the counter value in the first register.

In one embodiment of the present invention, the step of detecting a write operation comprises the sub-step of detecting a write operation to a first address associated with the first register.

In another embodiment of the present invention, the method further comprises the step of setting the counter value to a specified value by a write operation to a second address associated with the first register.

In still another embodiment of the present invention, the method further comprises the steps of: 1) detecting a read operation to the first address by the first packet processing element; and 2) in response to the detection of the read operation, returning the counter value from the first register to the first packet processing element and clearing the counter value in the first register.

In yet another embodiment of the present invention, the method further comprises the steps of: 1) detecting a read operation to the second address by the first packet processing element; and 2) in response to the detection of the read operation, returning the counter value from the first register to the first packet processing element.

In a further embodiment of the present invention, the method further comprises the step of setting an overflow flag in a second register when the counter value is incremented past a maximum value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
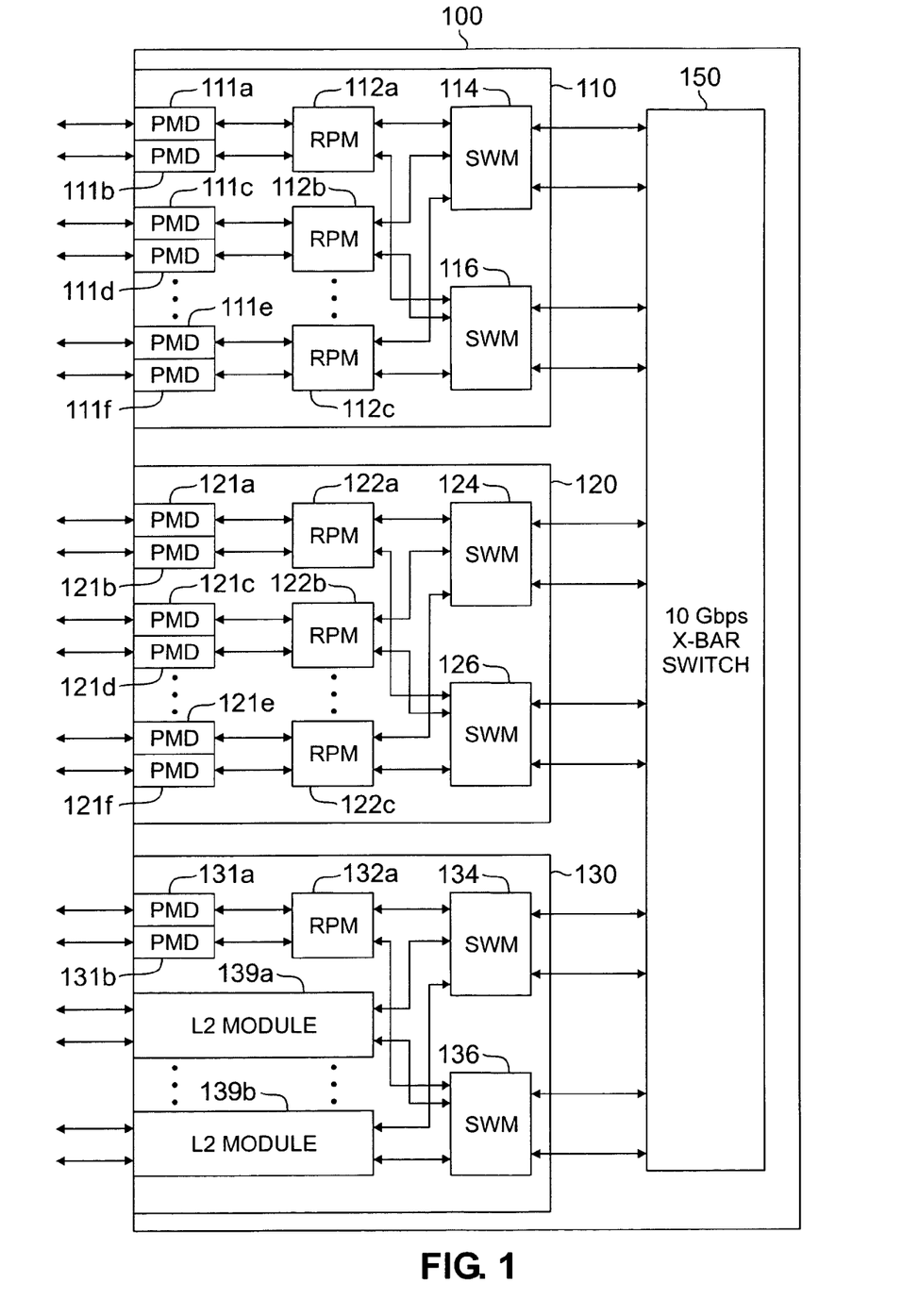
FIG. 1 illustrates an exemplary distributed architecture router, which performs traffic profiling according to the principles of the present invention.

FIG. 1 illustrates exemplary distributed architecture router 100, which performs traffic profiling according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
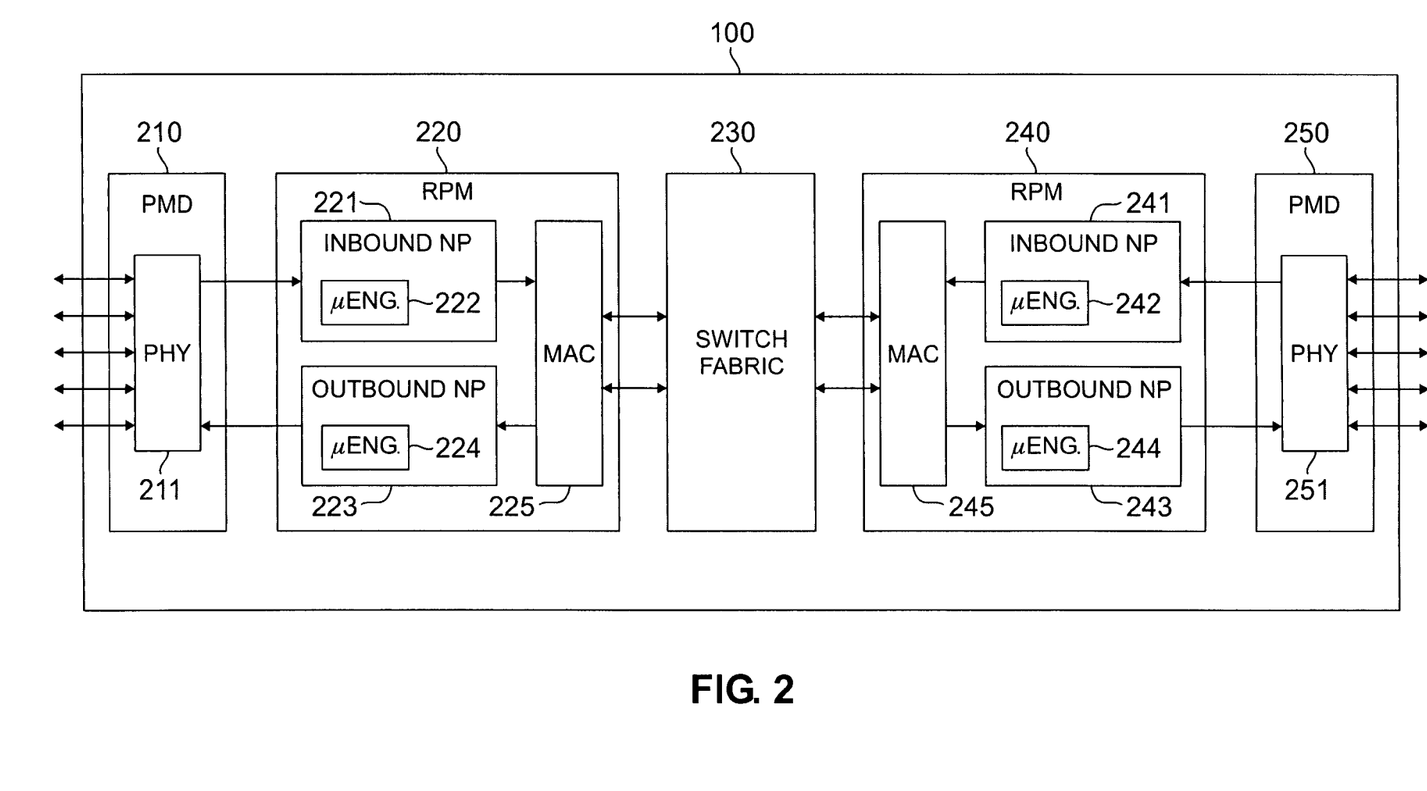
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
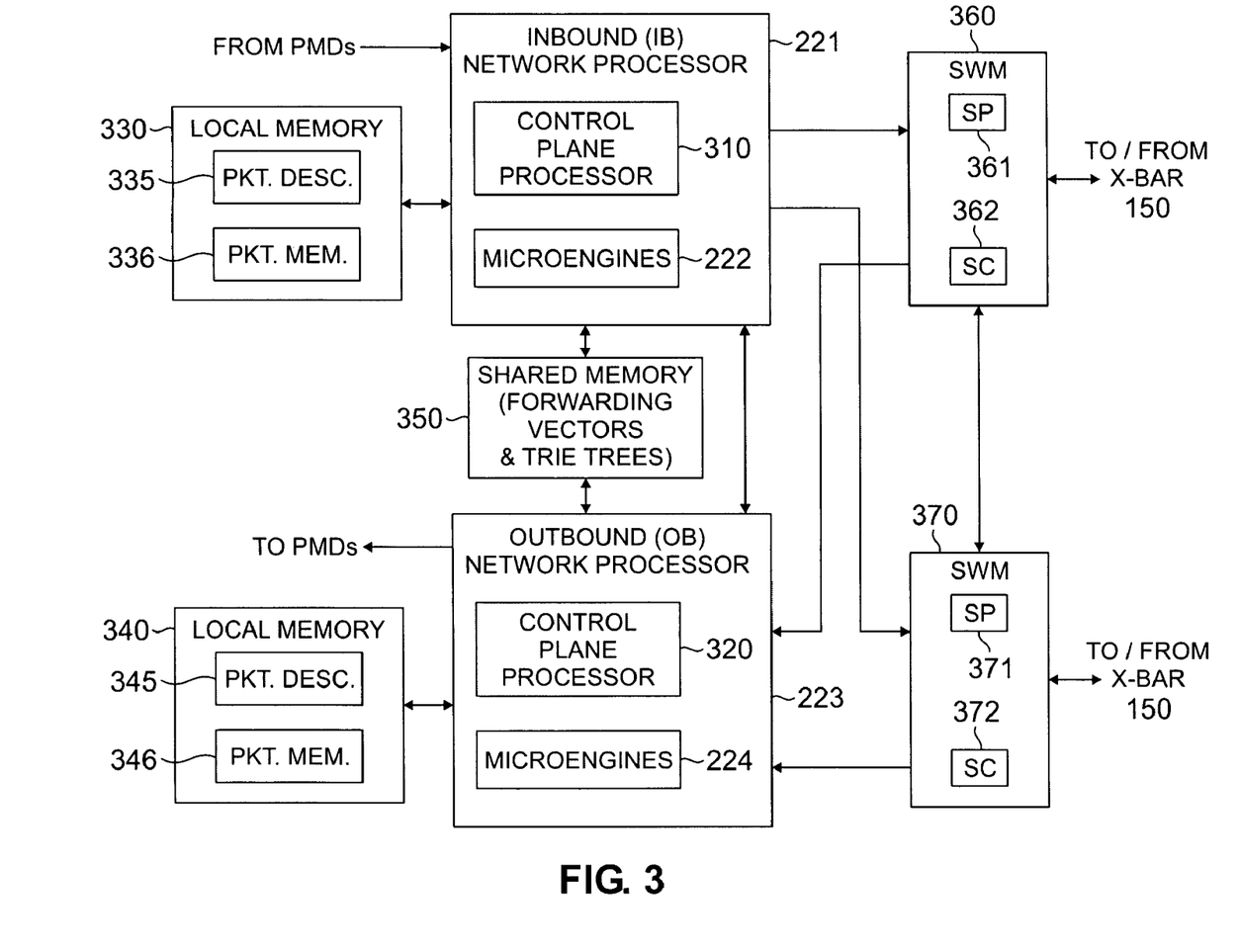
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through 10 Gbps links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794, 506, filed on Mar. 5, 2004, entitled "Apparatus and Method for Forwarding Mixed Data Packet Types in a High-Speed Router." The disclosure of U.S. patent application Ser. No. 10/794,506 is hereby incorporated by reference in the present application as if fully set forth herein. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module, or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the principles of the present invention, router 100 is capable of profiling internal and external data traffic in order to support advanced functions, such as traffic profiling and billing applications. The traffic profiling functionality is implemented in the both the control plane processors (XCPs) and the data plane processors (microengines) of the inbound network processors and the outbound network processors.

Figure 4:
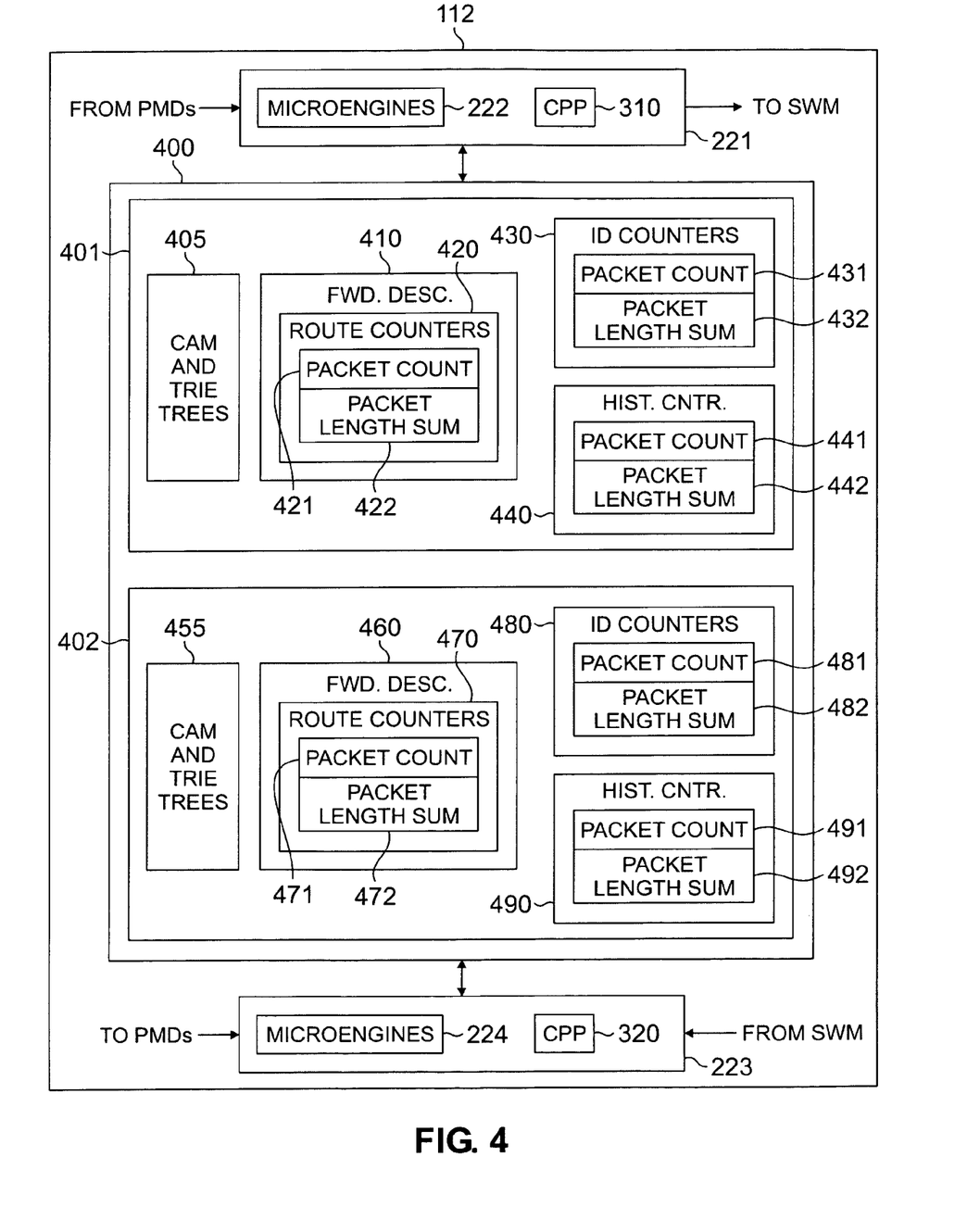
FIG. 4 illustrates traffic profiling circuitry in an exemplary route processing module according to an exemplary embodiment of the present invention.

FIG. 4 illustrates traffic profiling circuitry in exemplary route processing module (RPM) 112 according to an exemplary embodiment of the present invention. As in the case of FIG. 3, route processing module (RPM) 112 comprises inbound (IB) network processor (NP) 221 and outbound (OB) network processor (NP) 223. IB NP 221 comprises microengines 222 and control plane processor (CPP) 310. OB NP 223 comprises microengines 224 and control plane processor (CPP) 320.

IB NP 221 and OB NP 223 are shown coupled to memory 400. Memory 400 collectively represents local memory 330, local memory 340 and shared memory 350 in FIG. 3. Memory 400 is divided into two logical blocks, namely logical memory block 401 and logical memory block 402.

Logical memory block 401 comprises forwarding table information, search tree information, counters and other database structures used by IB NP 221. For example, logical memory block 401 comprises content addressable memory (CAM) and trie trees block 405, forwarding descriptors 410, ID counters 430 and histogram counters 440. Forwarding descriptors 410 comprises route counters 420 that maintain Packet Count values 421 and Packet Length Summation values 422 associated with individual routes in the forwarding tables. ID counters 430 comprise counters that maintain Packet Count values 431 and Packet Length Summation values 432 associated with selected traffic types, as explained below in greater detail. Histogram counters 440 comprise counters that maintain Packet Count values 441 and Packet Length Summation values 442 associated with the packet lengths of different traffic types and selected routes, as explained below in greater detail.

Similarly, logical memory block 402 comprises forwarding table information, search tree information, counters and other database structures used by OB NP 223. For example, logical memory block 402 comprises content addressable memory (CAM) and trie trees block 455, forwarding descriptors 460, ID counters 480 and histogram counters 490. Forwarding descriptors 460 comprises route counters 470 that maintain Packet Count values 471 and Packet Length Summation values 472 associated with individual routes in the forwarding tables. ID counters 480 comprise counters that maintain Packet Count values 481 and Packet Length Summation values 482 associated with selected traffic types, as explained below in greater detail. Histogram counters 490 comprise counters that maintain Packet Count values 491 and Packet Length Summation values 492 associated with the packet lengths of different traffic types and selected routes, as explained below in greater detail.

The RPM network processors (e.g., IB NP 221 and OB NP 223) execute the traffic profiling functions, including the packet length profiling. Microengines 222 and 224 in the data plane identify the traffic type of the data packets, count data packets based on traffic type, and sum (add up) the packet lengths of the classified data packets. Microengines 222 and 224 also accumulate counts as a function of packet size in packet size bins. In the control plane, CPP 310 and CPP 320 periodically gather the packet counts and length summations, compute short-term average frequencies, bandwidth and packet sizes and timestamp the data. CPP 310 and CPP 320 interface with billing or management applications to support billing or network analysis.

Microengines 222 and 224 count data packets of a certain type by incrementing Packet Count values 431 and 481 in ID counters 430 and 480 based on packet identity (i.e., traffic type) and sum the lengths of the packets meeting the classification criteria. Microengines 222 and 224 store the length sums in packet length sum values 432 and 482. Several types of identification are supported: incoming or outgoing physical port number, IP source or destination address, IP subnet (route), Class of Service (CoS), Layer 4 source or destination port (socket), and higher layer header information (e.g., http header information).

In one embodiment of the present invention, separate counts are maintained for each of these identification characteristics. However, throughput and memory size limits may restrict the number of counters and adders kept by each network processor. According to an exemplary embodiment of the present invention, three counter types are maintained, namely route counters, ID counters and histogram counters. Route counters 421 and 471 are contained in forwarding descriptors 410 and 460. Each route counter stores a Packet Count value (421, 471) and a Packet Length Sum value (422, 472) associated with a particular route. ID counters 430 and 480 are based on an index that is created from one or more of the traffic type identification characteristics. Histogram counters 440 and 490 are based on a packet size histogram bin. Thus, in a typical case, for each data packet, each one of IB NP 221 and OB NP 223 increments three counters and maintains three summations.

For each data packet entering router 100, the microengines build a CAM key and do a trie tree search, based on destination IP address or MPLS label. The trie tree search for a known route leads to a forwarding descriptor for the subnet given by the longest prefix match. Fields are set aside in each forwarding descriptor for a count (e.g., Packet Count value 421) of the number of packets for each route and for a summation (e.g., Packet Length value 422) of the number of bytes or words for each route. Thus, RPM 112 counts data packets on each route or subnet to which data packets are forwarded and sums bytes (or words) forwarded on each route or subnet.

Unknown routes are counted and summed in the forwarding descriptor for the associated default route. There may be default routes that are defined for cases where the first part of the prefix is associated with a known route and there may be default routes associated with totally unknown prefixes. If there is no default route for a data packet, then a separate invalid route counter is incremented and a separate packet length adder is used.

According to an exemplary embodiment, router 100 summarizes internal routes, so that each inbound network processor only knows the RPM to which a data packet must be sent, but does not know the output port. Several prefixes may be combined in these summarized routes. Thus, the forwarding descriptors of the inbound network processors (e.g., IB NP 221) give internal routes between RPMs within router 100. Therefore, the packet counts and packet length summations in forwarding descriptors 410 associated with IB NP 221 are useful for determining traffic flow within router 100. The counts and length summations in the forwarding descriptors of the outbound network processors (e.g., OB NP 223) are associated with the actual destination subnet. Thus, these packet counters and packet length summations are most useful for determining external traffic flow and for billing purposes.

To further qualify the network analysis and billing data (and to support CoS based forwarding), the CAM key may be used to build separate routes for different kinds of data. The CAM key is built using portions of the IPv4 address, IPv6 address, or MPLS label and a class of service (CoS) field. The IPv4 and IPv6 address portions are a part of the subnet determination. The forwarding descriptor may be for an MPLS packet, in which case the forwarding descriptor gives a count of the number of packets to the associated MPLS label.

The CoS portion of the CAM key may be used in a number of ways, such as CoS from IPv4, IPv6, or MPLS header fields, or as a Layer 4 socket address translated from a 12-bit socket address to an 8-bit CoS value. If the CoS field of the CAM key is not used, it is set to zero and the forwarding descriptor counts all packets to the associated subnet-based route. If the CoS field is used, then the forwarding descriptor count counts only packets of the associated CoS to the associated subnet. This allows CoS based traffic analysis, packet length analysis, and billing, as well as CoS based routing.

ID counters 430 and 480 are based on an index of one of the identification (ID) characteristics (i.e., traffic types) or a combination of the identification characteristics. Packet Count values 431 and 481 and Packet Length Sum values 432 and 482 are maintained for each ID and are indexed based on the ID. Any combination of the ID characteristics may be used as the index. The index is created based on information in each data packet. The associated packet counter is incremented and the packet length is added to the associated packet length summation.

The selection of characteristics to use is configured and may be limited to a subset of the possibilities. Exemplary indices for inbound network processor 221 are i) source physical port, ii) source IP address, iii) hashed source IP address, iv) Layer 4 source port (socket), v) CoS, vi) Layer 4 through 7 headers (e.g., http headers), and vii) combinations of ports or addresses with CoS. Exemplary indices for outbound network processor 223 are i) destination physical port, ii) destination IP address, iii) hashed destination IP address, iv) Layer 4 destination port (socket), v) CoS, vi) Layer 4 through 7 headers (e.g., http headers), and vii) combinations of port or address with CoS.

If adequate data plane bandwidth is present, router 100 may generate histograms of packet length. Several packet counters may be maintained for each route or ID, where each counter counts packets for a given range of packet sizes. However, it is more likely that packet length statistics for the router as a whole, instead of for a particular route, will be desired. In this case, each packet is counted based on its route and ID as described above and, in addition, each packet is counted by a set of route and ID independent counters, namely histogram counters 440 and 490, that count packets based on packet size, where there are several counters each covering a range of packet sizes. Router 100 may use such route and ID independent counters for packet length histograms due to memory size constraints and throughput considerations.

For example, Internet traffic is highly tri-modal. A large number of small packets (on the order of 64 bytes) are used for signaling purposes, such as acknowledgements. A moderate number of large packets (on the order of 1024 bytes) are used for data transfer. Some routers restrict packet length to less than 1024 bytes, typically on the order of 500 bytes, resulting in a large number of packets of this intermediate length. According to an advantageous embodiment of the present invention, router 100 may study the packet length mix by using, for example, three separate histogram counters based on packet size. A first histogram counter counts small packets (e.g., 69 bytes or less). A second histogram counter counts large packets (e.g., 1001 bytes or more). A third histogram counter counts intermediate packets (e.g., 70 to 1000 bytes). More resolution can be obtained by using more counters.

It is recommended that for easy index computations, the bin size be based on a divisor that is a power of 2, so that shifting or masking can be used in index computations. An example would be to have bins that are 128 bits wide, so that there are 8 bins to cover packets up to 1024 bytes. In addition, there may be corresponding Packet Length Summation values 442 and 492 giving route and ID independent summations of the packet lengths.

Control plane processors 310 and 320 periodically read the packet counters and packet length summations maintained by microengines 222 and 224, compute packet frequency and bandwidth utilization statistics, and timestamp the readings. The packet frequency (PF) is a short-term average traffic rate, obtained as follows:

$$PF = \text{Current ID Count}/(T2-T1),\qquad [\text{Eqn. 1}]$$

where the quantity (T2−T1) represents the elapsed time between the current samples (at time T2) and the previous samples (at time T1), assuming that the counter is cleared when read.

If the counter runs continuously, then the short term frequency is given by:

$$PF = (\text{Current ID Count} - \text{Previous ID Count})/(T2-T1)\qquad [\text{Eqn. 2}]$$

and control plane software must account for counter roll-over.

CPP 310 and CPP 320 periodically read packet length summations, thereby allowing billing based on bandwidth used. This allows CPP 310 and CPP 320 to inform the billing application of actual bandwidth usage. Bandwidth (BW) may be computed as a function of time, as follows:

$$BW = (CIPLS - PIPLS)/(T2-T1),\qquad [\text{Eqn. 3}]$$

where CIPLS is the Current ID Packet Length Summation value and PIPLS is the previous ID Packet Length Summation value.

In addition, packet length profiling may be done by determining the average packet length (APL) as a function of time, as follows:

$$APL = (CIPLS - PIPLS)/(CPC - PPC),\qquad [\text{Eqn. 4}]$$

where CPC is the Current Packet Count and PPC is the Previous Packet Count.

This data collection and processing results in traffic profile data. As FIG. 4 illustrates, router 100 implements separate instances of the traffic profile for each counter type in each network processor. Control plane processors 310 and 320 may furnish the complete set of traffic profile data to external traffic analysis systems or billing systems. Alternatively, control plane processors 310 and 320 may process the data prior to sending it. Processing may include a reduction in the amount of data by combining consecutive samples over a fixed time period to reduce the number of time of day samples. Processing also may combine several identity values into a single value. One example of this would be to combine data for all traffic classes (CoS values) of a subnet. Slices of this data through any plane may provide useful network analysis data. The data may be sent to the control processor in a master switch module (e.g., SWM 360), where composite data across the RPMs may be compiled.

In addition to the Packet Frequency, Bandwidth, and Average Packet Length data for each route and for each ID, as described above, route and ID independent data is available for making histograms of packet length as a function of time and average packet size for each histogram bin.

Router 100 may furnish traffic profile data to a management system through a network port or through an element management system (EMS) port. Router 100 may provide its billing information to a billing application within router 100 or to an external billing system. Typically, billing data will be sent by router 100 to a RADIUS server, located either within router 100 or external to it.

As noted above, packet counters or packet length adders may be updated in a multi-processor environment using atomic read-modify-write instructions or through synchronized time slices for each processor. However, the present invention provides packet data counters and packet length adders that may be updated by simple write operations as explained below in greater detail.

Figure 5:
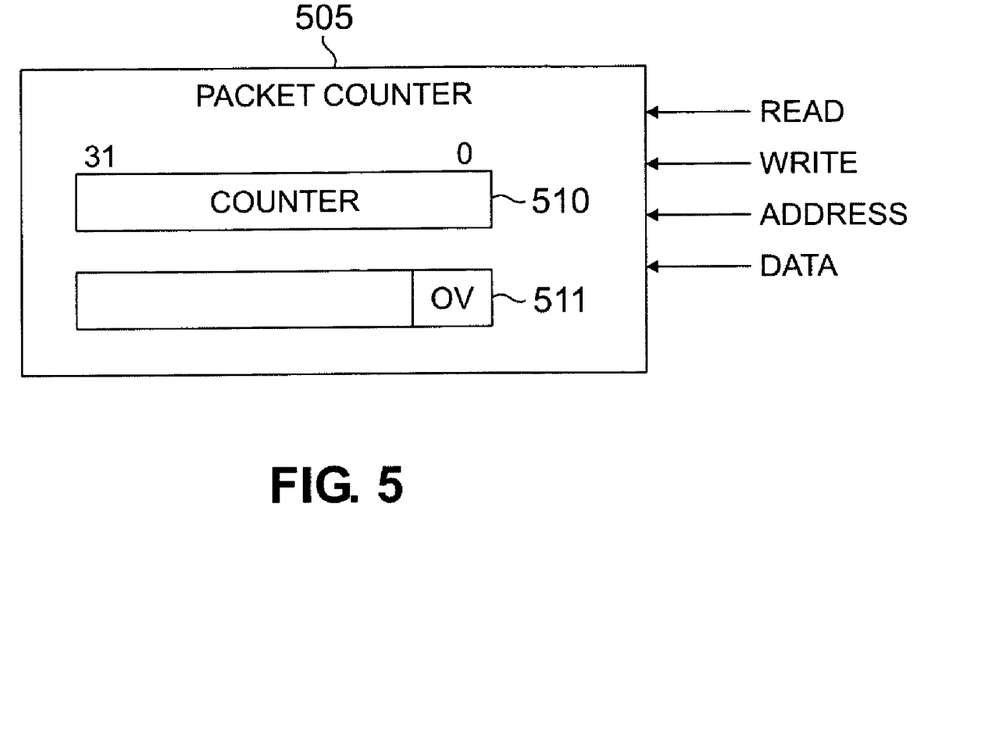
FIG. 5 illustrates an exemplary packet counter according to the principles of the present invention.

FIG. 5 illustrates exemplary packet counter 505 in exemplary route processing module (RPM) 112 according to the principles of the present invention. Packet counter 505 may be used to implement any one of the ID counters, route counters, or histogram counters in RPM 112 that simply count data packets and store the count value, such as the values stored in Packet Count values 421, 431, and 441. Packet counter 505 comprises register 510, which contains the counter value, and register 511, which contains an Overflow (OV) flag. In the exemplary embodiment, registers 510 and 511 are 32-bit registers. However, other register sizes, including 16-bit, 64-bit, 128-bit, and the like, may be used.

According to an advantageous embodiment of the present invention, memory blocks 401 and 402 may be implemented using field programmable gate array (FPGA) circuits that are capable of implementing packet counter 505. Packet counter 505 is mapped to two addresses. A read operation to the first address returns the counter value from register 510 to the network processor and clears the counter value from register 510 in packet counter 505. A read operation to the second address returns the counter value from register 510 to the network processor, but does not clear the counter value from register 510 in packet counter 505. A write operation to the first address increments the counter value in register 510 of packet counter 505. A write operation to the second address allows a specified counter value to be written into register 510 in packet counter 505. These counters are mapped into the address space of the control plane processor (e.g., CPP 310 or 320) and data plane processors (e.g., microengines 222 or 224). Typically the microengines perform write accesses to increment or set these counters and the control plane processor reads these counters.

As noted, the microengines of the network processors increment packet counter 505 by writing to the first address of packet counter 505. The hardware of packet counter 505 ignores the data on the bus during the write access to the first address and simply increments the 32 bit counter. If there is a roll-over from all Logic 1 values to all Logic 0 values, the hardware in packet counter 505 sets the Overflow (OV) flag in register 511. Software executed by the CPP or microengines may read the counter Overflow flag to check for overflows between read accesses. A read operation to register 511 returns the Overflow flag to the network processor and clears the Overflow flag.

According to the principles of the present invention, the increment is done in a single bus access to memory block 401 (or 402), so that bus arbitration functions resolve contentions between multiple threads and processors trying to access packet counter 505. Thus, control software is not needed to resolve contention problems when incrementing packet counter 505. It is assumed that a single process or thread reads packet counter 505 in a single bus access, so there also is no read contention. A read operation causes packet counter 505 to return the count value in register 510 in a single bus access read cycle.

Using specialized packet counters in this manner has a further advantage of not requiring software to do an increment instruction or to preload a value to write. The write value is a Don't Care value. Thus, no register must be loaded and no immediate data must be placed on the bus. This frees the processor from additional workload. This method is the fastest and most efficient way to increment counters. The counter may be built with a fixed increment value. Typically, this is one, but could be modified to count by some other increment, such as four to generate a byte count on 32 bit words.

Some of the packet statistics require that variable values be added to a summation. Examples of this are the packet length counters described above. Packet counter 505 described above may be modified to allow increments of variable size. This is done by placing the value to be added to the summation on the data bus during a write access to the summation address. The operation still takes place in a single bus cycle, thus avoiding contention problems. The overflow flag is set when the adder has a carry out.

Figure 6:
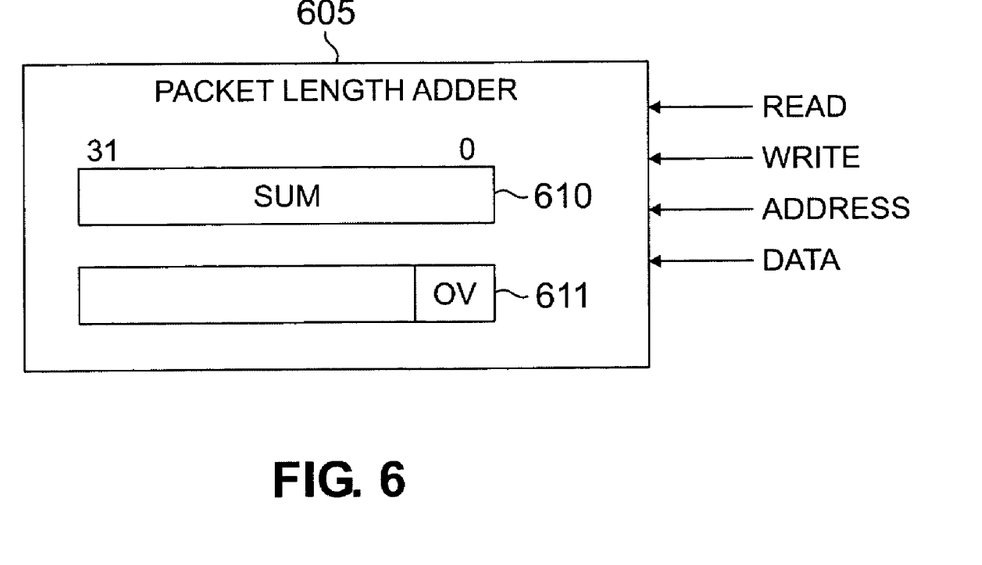
FIG. 6 illustrates an exemplary packet length adder according to the principles of the present invention.

FIG. 6 illustrates exemplary packet length adder 605 in exemplary route processing module (RPM) 112 according to the principles of the present invention. Packet length adder 605 may be used to implement any one of the ID counters, route counters, or histogram counters in RPM 112 that adds up the lengths of data packets and stores the length sum value, such the values stored in Packet Length Summation values 422, 432, and 442. Packet length adder 605 comprises register 610, which contains the summation value, and register 611, which contains an Overflow (OV) flag. In the exemplary embodiment, registers 610 and 611 are 32-bit registers. However, other register sizes, including 16-bit, 64-bit, 128-bit, and the like, may be used.

According to an advantageous embodiment of the present invention, memory blocks 401 and 402 may be implemented using field programmable gate array (FPGA) circuits that are capable of implementing packet length adder 605. Packet length adder 605 is mapped to two addresses. A read operation to the first address returns the summation value from register 610 to the network processor and clears the summation value from register 610 in packet length adder 605. A read operation to the second address returns the summation value from register 610 to the network processor, but does not clear the summation value from register 610 in packet length adder 605. A write operation to the first address adds the value on the data bus to the summation value in register 610 of packet length adder 605. A write operation to the second address allows a specified summation value to be written into register 610 in packet length adder 605. These adders are mapped into the address space of the control plane processor (e.g., CPP 310 or 320) and data plane processors (e.g., microengines 222 or 224). Typically the microengines perform write accesses to update or set these adders and the control plane processor reads these adders.

According to the principles of the present invention, the increment is done in a single bus access to memory block 401 (or 402), so that bus arbitration functions resolve contentions between multiple threads and processors trying to access packet length adder 605. Thus, control software is not needed to resolve contention problems when adding to the value in packet length adder 605. It is assumed that a single process or thread reads packet length adder 605 in a single bus access, so there also is no read contention. A read operation causes packet length adder 605 to return the count value in register 610 in a single bus access read cycle.

Although the present invention has been described with an exemplary embodiment, various changes and modifications may be suggested to one skilled in the art. It is intended that the present invention encompass such changes and modifications as fall within the scope of the appended claims.

What is claimed is:

1. A packet counter capable of storing a counter value of data packets processed by a plurality of processors in said multiprocessor system, said packet counter comprising:
   a first register capable of storing said counter value, wherein said counter value in said first register is incremented by a write operation to said packet counter, at a first address associated with said first register, made by a first one of said plurality of processors, wherein said counter value in said first register may be set to a specified value by a write operation to a second address associated with said first register, and wherein a read operation to said second address by said first processor returns said counter value from said first register to said first processor and does not clear said counter value in said first register.

2. The packet counter as set forth in claim 1, wherein a read operation to said first address by said first processor returns said counter value from said first register to said first processor and clears said counter value in said first register.

3. The packet counter as set forth in claim 2, further comprising a second register capable of storing an overflow flag, wherein said overflow flag is set when said counter value in said first register is incremented past a maximum value.

4. The packet counter of claim 1, wherein said read operation to said second address does not clear said counter value in said first register.

5. The packet counter of claim 1, wherein said read operation to said second address clears said counter value in said first register.

6. The packet counter as set forth in claim 1, further comprising a second register capable of storing an overflow flag.

7. The packet counter as set forth in claim 6, wherein said overflow flag is set when said counter value in said first register is incremented past a maximum value.

8. A packet length adder capable of storing a packet length summation value of data packets processed by a plurality of processors in said multiprocessor system, said packet length adder comprising:
   at least one register storing said packet length summation value,
   wherein said packet length summation value in said register is incremented by a packet length value on a data bus of said packet length adder by a write operation to said packet length adder, at a first address associated with said first register, made by a first one of said plurality of processors, wherein said packet length summation value in said first register may be set to a specified value by a write operation to a second address associated with said first register, and wherein a read operation to said second address by said first processor returns said packet length summation value from said first register to said first processor and does not clear said packet length summation value in said first register.

9. The packet length adder as set forth in claim 8, wherein a read operation to said first address by said first processor returns said packet length summation value from said first register to said first processor.

10. The packet length adder as set forth in claim 9, wherein said first processor does not clear said packet length summation value in said first register.

11. The packet length adders set forth in claim 8, wherein a read operation to said first address by said first processor returns said packet length summation value from said first register to said first processor and clears said packet length summation value in said first register.

12. The packet length adder as set forth in claim 11, further comprising a second register capable of storing an overflow flag.

13. The packet length adder as set forth in claim 12, wherein said overflow flag is set when said packet length summation value in said first register is incremented past a maximum value.

14. The packet length adders set forth in claim 8, further comprising a second register capable of storing an overflow flag, wherein said overflow flag is set when said packet length summation value in said first register is incremented past a maximum value.

15. A router for interconnecting external devices coupled to said router, said router comprising a switch fabric; and a plurality of routing nodes coupled to said switch fabric, wherein each of said plurality of routing nodes is capable of exchanging data packets with said external devices and with other ones of said plurality of routing nodes via said switch fabric, wherein a first of said plurality of routing nodes comprises:
a plurality of packet processing elements capable of routing data packets; and
a packet counter capable of storing a counter value of data packets routed by said plurality of packet processing elements, said packet counter comprising:
a first register capable of storing said counter value, wherein said counter value in said first register is incremented by a write operation to said packet counter, at a first address associated with said first register, made by a first one of said plurality of packet processing elements, wherein said counter value in said first register may be set to a specified value by a write operation to a second address associated with said first register, and wherein a read operation to said second address by said first packet processing element returns said counter value from said first register to said first packet processing element and does not clear said counter value in said first register.

16. The router as set forth in claim 15, wherein a read operation to said first address by said first packet processing element returns said counter value from said first register to said first packet processing element and clears said counter value in said first register.

17. The router as set forth in claim 16, further comprising a second register capable of storing an overflow flag, wherein said overflow flag is set when said counter value in said first register is incremented past a maximum value.

18. The router as set forth in claim 15, wherein a read operation to said first address by said first packet processing element returns said counter value from said first register to said first packet processing element and does not clear said counter value in said first register.

19. The router as set forth in claim 15, further comprising a second register capable of storing an overflow flag.

20. The router as set forth in claim 19, wherein said overflow flag is set when said counter value in said first register is incremented past a maximum value.

\* \* \* \* \*

UNITED STATES PATENT AND TRADEMARK OFFICE
CERTIFICATE OF CORRECTION

PATENT NO.        : 7,626,990 B2                                              Page 1 of 1
APPLICATION NO.   : 11/019935
DATED             : December 1, 2009
INVENTOR(S)       : Wybenga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1379 days.

Signed and Sealed this

Twenty-first Day of December, 2010

David J. Kappos
*Director of the United States Patent and Trademark Office*